United States Patent [19]
Saiki

[11] Patent Number: 5,642,156
[45] Date of Patent: Jun. 24, 1997

[54] VIDEO-CONFERENCE NETWORK MANAGING SYSTEM HAVING FUNCTION FOR MANAGING EACH SITE AND EACH SCHEDULE CONCERNING VIDEO CONFERENCE

[75] Inventor: Koichi Saiki, Kawasaki, Japan

[73] Assignee: Fujitsu Limited, Kanagawa, Japan

[21] Appl. No.: 585,291

[22] Filed: Jan. 11, 1996

Related U.S. Application Data

[63] Continuation of Ser. No. 205,289, Mar. 1, 1994, abandoned.

[30] Foreign Application Priority Data

Sep. 20, 1993  [JP]  Japan .................................. 5-233103

[51] Int. Cl.$^6$ .................................................. H04N 7/15
[52] U.S. Cl. ............................................. 348/15; 379/202
[58] Field of Search .................................. 348/15, 14, 16;
379/202, 203, 204, 205, 94, 96; 370/62;
H04N 7/15

[56] References Cited

U.S. PATENT DOCUMENTS 5,065,393  11/1991  Sibbitt et al. ........................... 370/62
5,099,510  3/1992  Blinken, Jr. et al. .................. 379/202
5,323,445  6/1994  Nakatsuka ................................ 348/15

FOREIGN PATENT DOCUMENTS

401054788  2/1992  Japan ............................... H04N 7/15
404290361  10/1992  Japan ..................................... 379/54
405122690  5/1993  Japan ............................... H04N 7/15

Primary Examiner—Stella Woo

[57] ABSTRACT

A video-conference network managing system manages a video-conference network, the video-conference network comprising a plurality of video-conference terminal apparatuses connected with one another via a network so as to enable a video conference to be held. The managing system comprises a site managing unit for managing each video-conference terminal apparatus of the plurality of video-conference terminal apparatuses. The system further comprises a schedule managing unit for managing a schedule concerning the video conference. The system further comprises a transmitting/reception control unit for sending, if appropriate, a command to the plurality of video-conference terminal apparatuses in accordance with the schedule concerning the video conference. The system further comprises an alarm collecting unit for collecting alarm information, if any, from the plurality of video-conference terminal apparatuses.

12 Claims, 6 Drawing Sheets

| VIDEO-CONFERENCE NAME | SUBSCRIBER NUMBER | VIDEO-CONFERENCE STARTING DATE/TIME | VIDEO-CONFERENCE ENDING DATE/TIME | ALARM FLAG | RESERVATION FLAG |
|---|---|---|---|---|---|
| A | a1 | 13:00 | 15:00 | 0 | 1 |
| A | a2 | 〃 | 〃 | 0 | 1 |
| A | a3 | 〃 | 〃 | 0 | 1 |
| B | b1 | 14:00 | 15:00 | 0 | 1 |
| B | b2 | 〃 | 〃 | 0 | 1 |
| C | c1 | 15:30 | 17:00 | 0 | 1 |
| C | c2 | 〃 | 〃 | 1 | 1 |
| C | c3 | 〃 | 〃 | 0 | 1 |
|   |   |   |   |   | 0 |
| ⋮ | ⋮ | ⋮ | ⋮ | ⋮ | ⋮ |
|   |   |   |   |   | 0 |

12B SCHEDULE MANAGEMENT TABLE

VIDEO-CONFERENCE NETWORK MANAGING SYSTEM HAVING FUNCTION FOR MANAGING EACH SITE AND EACH SCHEDULE CONCERNING VIDEO CONFERENCE

This is a continuation of application Ser. No. 08/205,289, filed Mar. 1, 1994, now abandoned.

BACKGROUND OF THE INVENTION

1. The Field of the Invention

The present invention relates to a video-conference network managing system for managing a video-conference which uses video-conference terminal apparatuses.

A video-conference network is formed by connecting video-conference terminal apparatuses located at remote distance from one another, the connecting being realized by using a network or using a network and a multi-point control apparatus. A system may be devised in which, using the formed video-conference network, the video conference is held while respective videos to the corresponding plurality of sites are transmitted/received. In such a system, it is desired to manage the video-conference network efficiently.

2. Description of Related Art

In the related art, the video conference is started, for example as follows: One of the participants in the video conference, for example, the sponsor of the conference calls a remote video-conference terminal apparatus with reference, for example, to a video-conference schedule table so as to establish the necessary communication circuit between them. If, instead, there are more than three participants in the video conference, a multi-point control apparatus is used to connect the plurality of video-conference terminal apparatuses with one another. In this case, for example, the sponsor of the video conference or a manager of the multi-point control apparatus, calls respective remote video-conference terminal apparatuses with reference, for example, to the video-conference schedule table, so as to establish the necessary communication circuits among them. Thus, the video conference is started.

Normally, such a video conference is held by establishing the necessary circuits among the video-conference terminal apparatuses within the same company or a specific group. Therefore, if a participant in the video conference or a manager of the multi-point control apparatus erroneously calls a video-conference terminal apparatus belonging to another group, a problem may occur. Further, there may be a case where the video conference can not be held on the expected date because, for example, some persons to be the participants have overlooked the corresponding schedule on the schedule table due to errors. Further, there may be a case where, due to an error, a video-conference terminal apparatus which has to participate in the video conference is not called. Further, there may be a case where holding of the video conference at an arbitrary time is not allowed because the multi-point control apparatus only has a capability of allowing simultaneous holding of a limited number of video conferences. In order to prevent occurrence of such a problem, the following system may be devised (please refer, for example, to Japanese Laid-Open Patent Application No.1-208066 or Japanese Laid-Open Patent Application No.4-280153): a reservation center is provided for receiving reservations for video conferences, the video conferences being held successively in accordance with the thus received respective corresponding reservations.

Further, there may be a case where a certain trouble occurs in the video-conference terminal apparatus(es) or in the multi-point control apparatus of the video-conference network in the related art. In this case, the occurrence of the trouble may first be found out due to the trouble-occurred apparatus giving no response when the communication circuit for the video conference is to be established. The occurrence of the trouble may be instead first found out based on information given by the operator of the apparatus in which the trouble has occurred, that is the video-conference terminal apparatus or the multi-point control apparatus.

As a result, the following case may occur: even though a reservation has been previously made by a suitable organization such as the reservation center, a participant associated with a video-conference terminal apparatus cannot participate in the video conference since a certain trouble has occurred in the participant's video-conference terminal apparatus at the date/time of the video conference. In this case, another participant cannot recognize the reason for the absence of the participant associated with the video-conference terminal apparatus having the trouble. Thus, in the related art, it is not possible to integratedly manage the video-conference network, which as a result becomes more complicated.

SUMMARY OF THE INVENTION

An object of the present invention is to enable, using measures such as schedule management and/or alarm collection, integrated management of the video-conference network, which network will become more complicate in the future.

Figure 1:
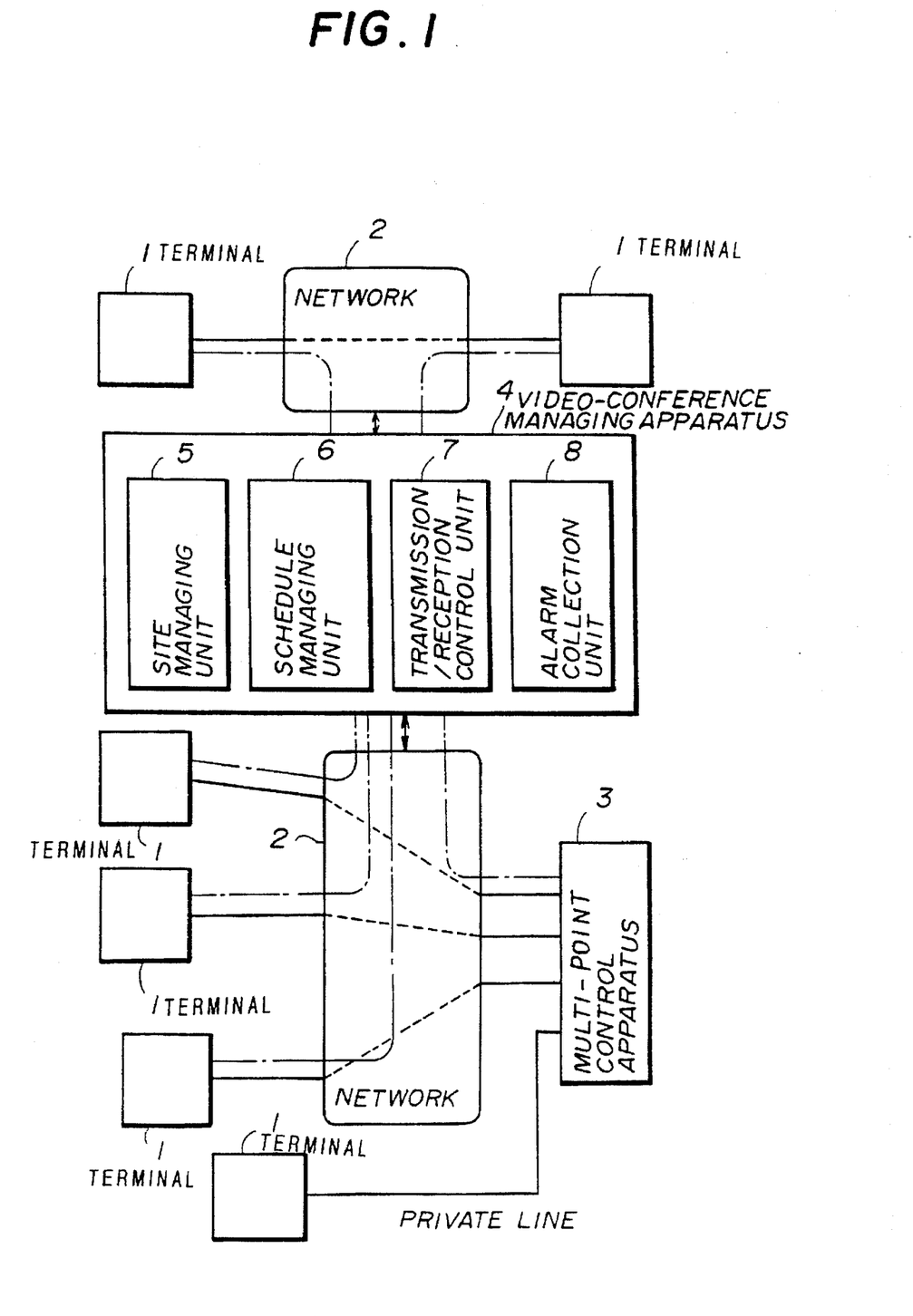
FIG. 1 shows a block diagram for illustrating a principle of the present invention.

To achieve the above object of the present invention, the video-conference network managing system according to the present invention comprises a construction as described below with reference to FIG. 1. In the system of FIG. 1, a plurality of video-conference terminal apparatuses 1 are connected with one another via a network 2 or via the network 2 and a multi-point control apparatus 3. Thus, a video-conference network is formed, a video conference being held by using the plurality of video-conference terminal apparatuses 1 in the formed video-conference network. In the system of FIG. 1, a video-conference managing apparatus 4 manages this video-conference network. The video-conference managing apparatus 4 comprises a site managing unit 5 for managing the plurality of video-conference terminal apparatuses 1 and the multi-point control apparatus 3. The video-conference managing apparatus 4 further comprises a schedule managing unit 6 for managing a schedule of the video conference. The video-conference managing apparatus 4 further comprises a transmission/reception control unit 7 for sending an appropriate command in accordance with the schedule of the video conference as described below. The video-conference managing apparatus 4 further comprises an alarm collecting unit 8 for collecting alarm information, if any, from the plurality of video-conference terminal apparatuses and the multi-point control apparatus. The above schedule of the video conference to be managed by the schedule managing unit 6 comprises video-conference participant information and video-conference date/time information, each type of information resulting from reception of corresponding reservations. The above transmission/reception control unit 7, in accordance with the above schedule concerning the video-conference managed by the schedule managing unit 6, sends the command for starting the video conference to a video-conference terminal apparatus 1, among said plurality of video-conference terminal apparatuses 1, specified in said video-conference participant information. The transmission/ reception control unit 7 further sends the alarm information collected by the alarm collecting unit 8 to the video-conference terminal apparatus 1 specified in the above video-conference participant information.

The schedule managing unit 6 has a schedule management table comprising an area in which the video-conference participant information, the video-conference date/time information and an alarm flag are filled therein. The transmission/reception control unit 7, using the schedule managing table, sends an appropriate command for starting the video conference based on the video-conference date/time information and the video-conference participant information resulting from the reception of corresponding reservations. The transmission/reception control unit 7 then either removes the alarm flag, previously set, on the schedule managing table, for a first video-conference terminal apparatus 1 from among the plurality of video-conference terminal apparatuses 1, if the first video-conference terminal apparatus 1 responds to the command sent for starting the video conference, or maintains the set state of the alarm flag for the first video-conference terminal apparatus 1 if the first video-conference terminal apparatus 1 does not respond to the sent command. The transmission/reception control unit 7 then informs a second video-conference terminal apparatus (or apparatuses) 1 concerning the relevant video conference from among the plurality of video-conference terminal apparatuses 1 that the first video-conference terminal apparatus 1 will not participate in the relevant video conference.

The transmission/reception control unit 7, using the schedule managing table, periodically calls the first video-conference terminal apparatus 1 before the date/time of the relevant video conference. The first video-conference terminal apparatus 1 (or apparatuses) to be called is (or are) selected from among the plurality of video-conference terminal apparatuses 1 due to the relevant video-conference terminal apparatus being registered as a result of the corresponding reception of the reservation. The transmission/reception control unit 7 then determines that a certain trouble has occurred in the first video-conference terminal apparatus among the plurality of video-conference terminal apparatuses 1 if the first video-conference terminal apparatus 1 does not respond to the periodical calls, the transmission/reception control unit 7 as a result setting the alarm flag, in the schedule managing table, for the first video-conference terminal apparatus 1. The transmission/reception control unit 7 then again periodically calls the first video-conference terminal apparatus 1, and then removes the once set alarm flag for the first video-conference terminal apparatus 1 if the first video-conference terminal apparatus 1 responds to the periodical calls made again by the control unit.

The multi-point control apparatus 3 is connected with the network 2 so as to form a video-conference network and is also connected with another video-conference terminal apparatus 1 via a private line so as to form another video-conference network. The multi-point control apparatus 3 then appropriately connects the video-conference network formed via the network 2 to the video-conference network formed via the private line, in accordance with the schedule concerning the video conference managed by the schedule managing unit 6.

The schedule managing unit 6 has a schedule management table comprising an area in which the video-conference participant information, the video-conference date/time information, the alarm flags and reservation flags are filled therein. The schedule managing unit sets appropriately the reservation flag, in the schedule managing table, for a video-conference terminal apparatus 1 among the plurality of video-conference terminal apparatuses 1, in response to a corresponding reception of a reservation and removes the once set reservation flag after the relevant video conference is finished. The video-conference network managing system further comprises a supplementary managing apparatus which searches the schedule managing table for the reservation flag. The supplementary managing apparatus then determines that a certain trouble has occurred in the video-conference network managing system if the reservation flag still remains even if the ending date/time of the relevant video conference has already passed, the supplementary managing apparatus as a result performing the processing which was to be originally performed by the schedule managing unit 6.

In the above mentioned system, the site managing unit 5 actually manages information such as, for example, a subscriber number, a set area and a group name, associated with each of the video-conference terminal apparatuses 1 and the multi-point control apparatus 3. The video-conference participant information managed by the schedule managing unit 6 comprises, for example, subscriber numbers and group names, associated with the video-conference terminal apparatuses determined as a result of the corresponding reception of a reservation. Further, it is possible to add the subscriber number of the other video-conference terminal apparatus or to add the subscriber number of the multi-point control apparatus 3. In this case, the video-conference terminal apparatus 1 may call the other video-conference terminal apparatus 1 or may call the multi-point control apparatus 3 so as to establish a communication circuit for the purpose of enabling the relevant video conference to be held. Further, the alarm information collected by the alarm collecting unit 8 is sent to the video-conference terminal apparatuses 1 of the participants of the relevant video conference as mentioned above. Thus, these participants' video-conference terminal apparatus can recognize the trouble indicated by the sent alarm information, if the trouble has occurred in one of the participant's video-conference terminal apparatuses 1.

Further, the schedule managing unit 6 comprises an internal clock. Using time information provided by the internal clock, the unit 6 reads the above-mentioned video-conference participant information when the current time becomes the starting date/time of the video conference. Then, the unit 6 sends the command indicating the start of the video conference to the relevant participants' video-conference terminal apparatuses 1. If any of the relevant participants' video-conference terminal apparatuses 1 does not respond to the thus sent command, the unit 6 determines that a certain trouble has occurred in the relevant video-conference terminal apparatus 1, the unit 6 as a result setting the alarm flag for this relevant terminal apparatus 1. On the other hand, in a case where the alarm flag is previously set, and if the relevant terminal apparatus 1 responds to the command, the unit 6 determines that a trouble which has previously occurred in the terminal apparatus 1 has been removed. As a result, the unit 6 removes the alarm flag previously set for the terminal apparatus 1. Further, the unit 6 may inform the other participants' terminal apparatuses 1 that a certain terminal apparatus 1, even if it was originally a participant in the relevant video conference, cannot participate in the video conference due to a certain trouble occurring in the certain terminal apparatus 1.

The manner in which the transmission/reception control unit 7 actually calls the video-conference terminal apparatuses 1 determined as a result of the corresponding reception of reservation will now be described. The unit 7 calls the relevant terminal apparatus 1 repeatedly in a predetermined period, for example, every hour, before the starting date/time of the relevant video conference. If the called terminal apparatus 1 responds to this calling, the unit 7 determines that the responding terminal apparatus 1 is in the normal state, the unit 7 as a result causing the alarm flag for this terminal apparatus 1 to be removed or maintaining a alarm-flag removed state for the terminal apparatus 1. On the other hand, if no response is provided by the called terminal apparatus 1, the unit 7 determines that a certain trouble has occurred in the non-responding terminal apparatus 1, the unit 7 as a result setting the alarm flag for this terminal apparatus. Thus, the unit 7 can recognize which terminal apparatus (or apparatuses), among the participants' video-conference terminal apparatuses, are in the normal state.

The multi-point control apparatus 3 is actually connected with the network 2, such as a general public network, so as to form the video-conference network. Further, apparatus 3 is also connected with another video-conference terminal apparatus 1 via a private line so as to form another video-conference network, as mentioned above. There may be a case where a video-conference schedule is reserved by the schedule managing unit 6. The relevant video conference will be held by participants comprising one having the video-conference terminal apparatuses 1 connected via the above private line and one having the video-conference terminal apparatuses 1 connected via the above network 2. In this case, the transmission/reception control unit 7, using the schedule managing table associated with the schedule managing unit 6, sends the command to start the video conference to the multi-point control apparatus 3. As a result, the multi-point control apparatus 3 connects the video-conference network formed via the network 2 to the video-conference network formed via the private line. Thus, it is easy for a video conference between the video-conference terminal apparatuses 1 located in a wide area to be held.

The above-mentioned supplementary managing apparatus actually acts as follows: If the reservation flag still remains even if the ending date/time of the relevant reserved video conference has been passed, the supplementary managing apparatus determines that the reserved video conference cannot be held due to a certain trouble having occurred in the video-conference network managing apparatus 4. As a result, the supplementary managing apparatus, instead of the trouble-occurring video-conference network managing apparatus 4, appropriately directs that the relevant reserved video conference be held. This directing is carried out using the schedule managing table. Thus, it is possible to improve reliability of the video-conference network.

Other objects and further features of the present invention will become more apparent from the following detailed description when read in conjunction with the accompanying drawings.

DESCRIPTION OF THE PREFERRED EMBODIMENTS

Figure 2:
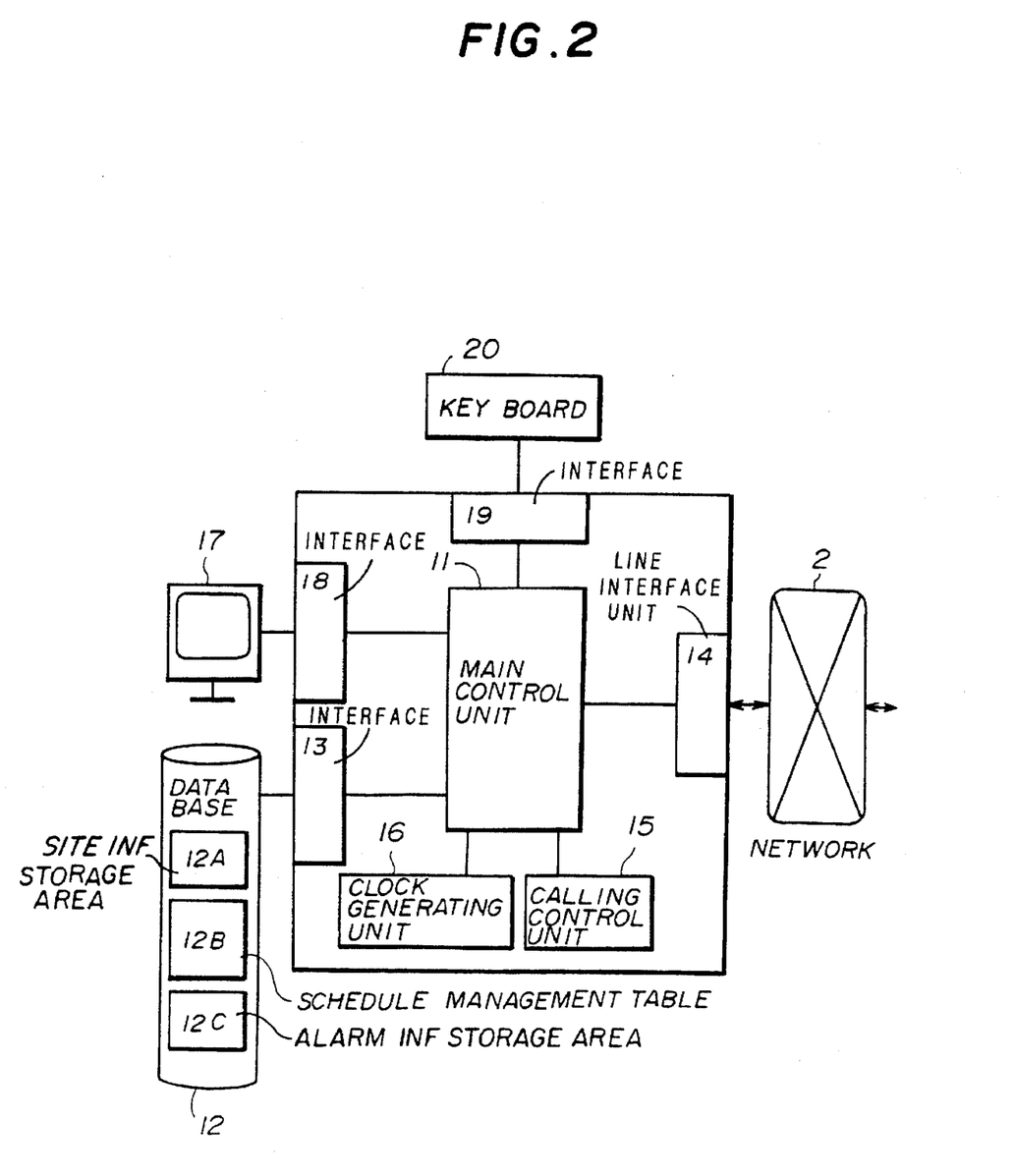
FIG. 2 shows a block diagram for illustrating a video-conference network managing apparatus in a first embodiment of the present invention.

A video-conference network managing apparatus in a first embodiment of the video-conference network managing system according to the present invention will now be described with reference to FIG. 2. FIG. 2 shows the construction of the video-conference network managing apparatus 4 of FIG. 1. The network 2 is connected with the apparatus 4, the apparatus 4 comprising a main control unit 11. A data base 12, comprising a site-information storing area 12A, a schedule management table 12B and an alarm-information storing area 12C, is provided for the apparatus 4. The apparatus 4 comprises a data-base interface unit 13 provided between the main control unit 11 and the data base 12. The apparatus 4 further comprises a line interface unit 14 provided between the network 2 and the main control unit 11. The apparatus 4 further comprises a calling control unit 15 and a clock generating unit 16, each being connected with the main control unit 11. Further, a display device 17 and a keyboard 20 are provided for the apparatus 4, each being connected with the main control unit 11 via a respective one of interface units 18 and 19.

The data base 12 may be realized by using a data storing device such as, for example, a magnetic disc device, a magneto-optical disc device, or a semiconductor-integrated-circuit storing device. The site information storing area 12A formed in the data base 12 is used for storing site information comprising the following information: Either information such as that concerning subscriber numbers and located regions of video-conference terminal apparatus and a multi-point control apparatus; or information such as that comprising group names, for example, for the purpose of holding a closed-area video conference. The schedule management table 12B formed in the data base 12 is used for registering reservation information for video conferences. The alarm-information storing area 12C formed in the data base 12 is used for storing alarm information.

Further, the main control unit 11 is realized by a processor, for example. The site managing unit 5 of FIG. 1 is realized by a processing function provided by the main control unit 11 and the site-information storing area 12A. The schedule managing unit 6 of FIG. 1 is realized by a processing function provided by the main control unit 11 and the schedule managing table 12B. The alarm collecting unit 8 of FIG. 1 is realized by a processing function provided by the main control unit 11 and alarm-information storing area 12C. Further, the transmission/reception control unit 7 is realized by the processing function of the main control unit 11 and the calling control unit 15.

The clock generating unit 16 generates a clock signal and provides it to each unit. The keyboard 20 is used for inputting commands and/or various sorts of data necessary for managing the video-conference network. The display device 17 is used for displaying the thus input command and/or various sorts of data. The display device 17 is also used for using the site-information storing area 12A, schedule management table 12B and alarm-information storing area 12C, under the control by the main control unit 11, so as to display information concerning a managing-condition associated with the video-conference network. Further, it is possible to provide a plurality of the line-interface units 14 and uses them for connecting the video-conference network managing apparatus 4 with a respective plurality of the networks 2.

A reservation request for holding a video conference may be sent from the video-conference terminal apparatus or multi-point control apparatus 3 via the network 2. In this case, the main control unit 11, using the function of the site managing unit 5, reads the site information stored in the site-information storing area 12A. The main control unit 11 then determines whether or not the video-conference terminal apparatus, which has thus sent the reservation request, is a apparatus which is in a state where no relevant trouble exists so that the relevant apparatus can participate in the relevant video conference. If it is determined that the relevant video-conference terminal apparatus is in the no-trouble state, then the main control unit 11, using the function of the schedule managing unit 6, stores, in the schedule management table 12B, corresponding reservation information concerning, for example, the starting date/time and video-conference participant list. Thus the main control unit 11 performs the reservation reception, and informs the relevant one of the video-conference terminal apparatus and the multi-point control apparatus that reservation-reception has been completed after the completion of the reservation reception. As a result, the reservation reception processing is terminated.

On the other hand, the video-conference network managing apparatus 4, using the function of the alarm collecting unit 8, collects alarm information if any, via the network 2, from the video-conference terminal apparatuses and the multi-point control apparatus. The apparatus 4 then stores the collected alarm information in the alarm-information storing area 12C. If the collected alarm information comprises information provided from the video-conference terminal apparatus which is previously registered in the schedule management table 12B, the relevant matter concerning the collected alarm information is displayed on the schedule management table 12B.

Further, the main control unit 11 has a clock function including a calender function. The main control unit 11, periodically at a predetermined time intervals, compares the date/time indicated by the clock function with the video-conference starting date/time registered in the schedule management table 12B. If they are found to coincide with one another as a result of the comparison, then the main control unit 11 reads subscriber numbers from the schedule management table 12B. The subscriber numbers to be read comprise ones associated with the video-conference terminal apparatuses belonging to persons who will participate in the relevant video conference. Then, the main control unit 11 activates the calling control unit 15 so as to send a command to commence the video-conference to a video-conference terminal apparatus belonging to a person participating in the video conference, through the unit 15. The video-conference terminal apparatus, to which the command is sent, calls the other video-conference terminal apparatus so as to commence the video conference. It is also possible, instead of using the above commencement manner, to send the above command to commence the video-conference commencement to the multi-point control apparatus. In this case, the above command comprises the video-conference participant information. As a result, the multi-point control apparatus may establish communication lines necessary for carrying out the video conference by calling the video-conference terminal apparatuses belonging to persons who will participate in the relevant video conference.

The schedule management table will now be described with reference to FIG. 3. The schedule management table comprises areas for storing video-conference names, the subscriber numbers of the video-conference terminal apparatuses, the video-conference starting dates/times, the video-conference ending dates/times, the alarm flags and the reservation flags. In an example of FIG. 3, the video conference having a name A is reserved for the video-conference terminal apparatuses, the subscriber numbers of which comprise a1, a2, and a3, the video-conference starting date/time of which conference is 13:00 and the video-conference ending date/time is 15:00. Similarly, the video conference having a name B is reserved for the video-conference terminal apparatuses, the subscriber numbers of which comprise b1 and b2, the video-conference starting date/time of which conference is 14:00 and the video-conference ending date/time is 15:00. Furthermore, the video conference having a name C is reserved for the video-conference terminal apparatuses, the subscriber numbers of which comprise c1, c2, and c3, the video-conference starting date/time of which conference is 15:30 and the video-conference ending date/time is 17:00. Thus, it is possible to receive reservations of the video conferences held by different groups, even though the times for holding the conferences overlap one another. However, in order to enable such a manner of reservation reception, it is required to use a plurality of the multi-point control apparatuses.

It is possible to make each reservation flag indicate an under-reservation state, an under-holding-video conference state, an under-video conference-normally ended state and an under-video conference-abnormally ended state. Such indication is enabled by forming each reservation flag of 2 bits. A value "1" is set as each alarm flag when the alarm information is collected from the corresponding video-conference terminal apparatus which is reserved to act to hold the video conference. Therefore, each alarm flag has a value "0" when the corresponding video-conference terminal apparatus is in a normal state. In the example of FIG. 3, a certain trouble has occurred in the video-conference terminal apparatus, having the subscriber number c2 thereof, which is reserved to act to hold the C-named video conference. As shown in FIG. 3, "1" is set as the alarm flag of the subscriber number c2.

Figure 4:
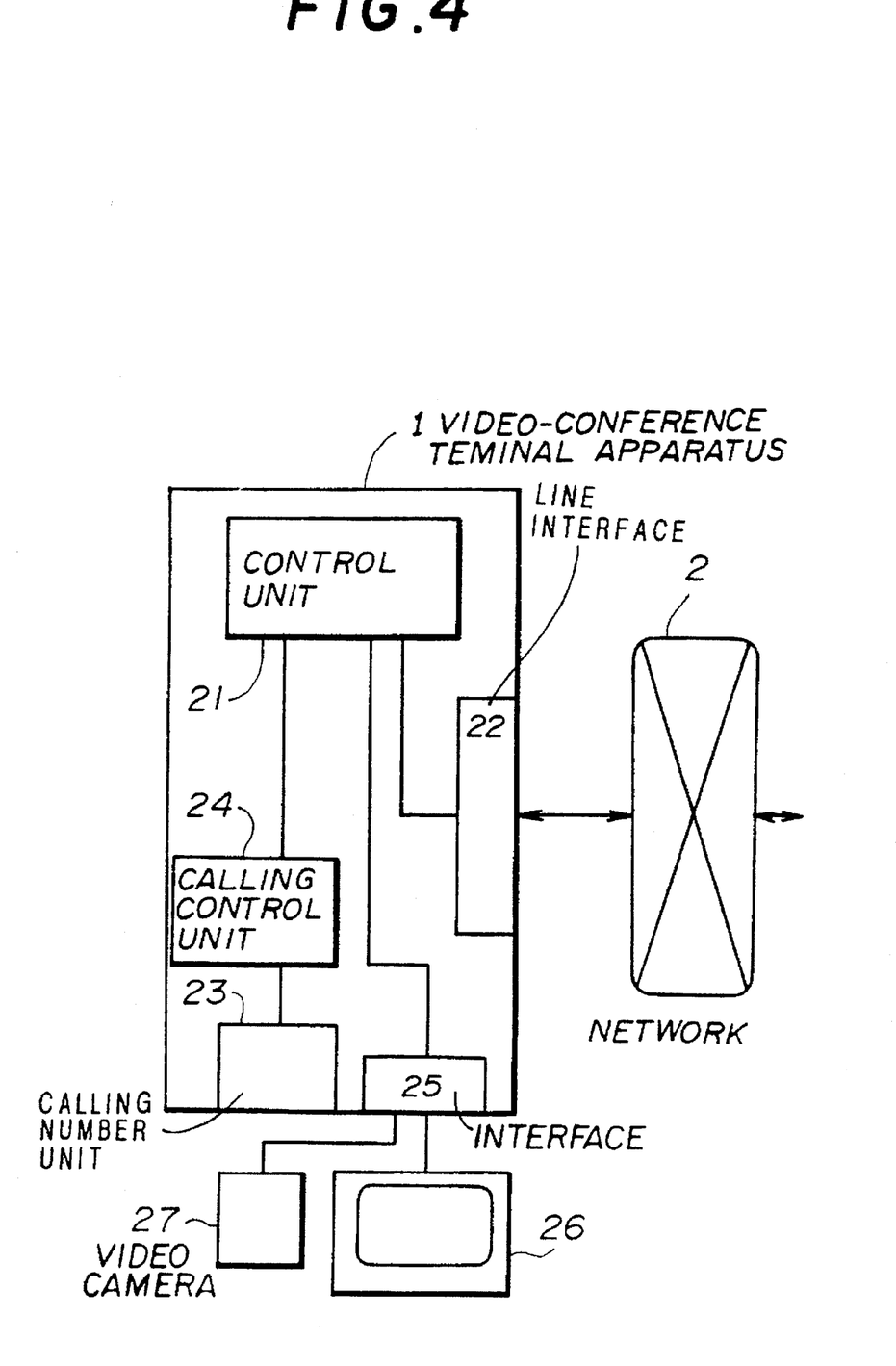
FIG. 4 shows a block diagram for illustrating a video-conference terminal apparatus in the first embodiment of the present invention.

The video-conference terminal apparatus in the first embodiment of the video-conference network management system according to the present invention will now be described with reference to FIG. 4. The video-conference terminal apparatus comprises the control unit 21, a line interface unit 22, a calling-number input unit 23 for inputting calling numbers such as dialing numbers, a calling control unit 24, an interface unit 25, a monitor display 26, and a video camera 27. A picture of the video-conference participant is taken through the video camera 27 and the monitor display displays the picture sent from the other remote video-conference terminal apparatus thereon. The control unit 21 activates the calling control unit 24 if a certain trouble occurs, for example, in the monitor display 26 or the video camera. Then, the thus activated calling control unit 24 automatically calls the video-conference network management apparatus so as to transmit the corresponding alarm information.

Figure 5:
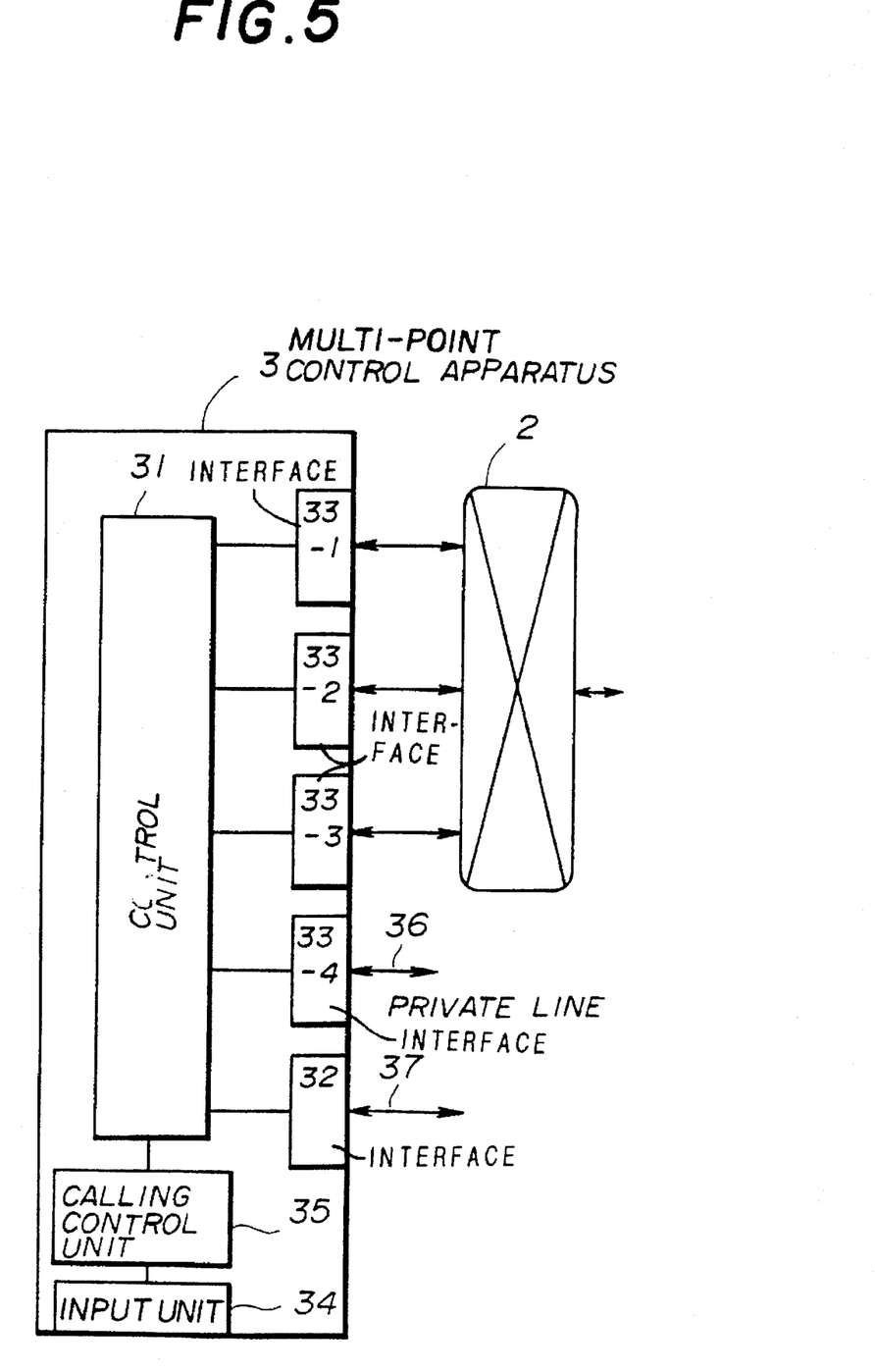
FIG. 5 shows a block diagram for illustrating a multi-point control apparatus in the first embodiment of the present invention.

The multi-point control apparatus 3 in the first embodiment of the video-conference network management system according to the present invention will now be described with reference to FIG. 5. The multi-point control apparatus 3 comprises a control unit 31, an interface unit 32 for connecting the multi-point control apparatus with the video-conference network management apparatus via a line 37, line interface units 33-1, 33-2 and 33-3, a private-line interface unit 33-4 for connecting the multi-point control apparatus with a private line 36, a calling-number setting and input unit 34, and a calling control unit 35. The line 37 is connected with the network 2 or another network to connect the multi-point control apparatus 3 with the video-conference network management apparatus 4 as mentioned above.

The operation regarding the video-conference network management apparatus in the first embodiment of the video-conference network management system according to the present invention will now be described with reference to the respective drawings. First, an operator inputs the site information to the video-conference network management apparatus 4 through the keyboard 20, for example. The site information to be input comprises, for example, device types of the video-conference terminal apparatuses 1 and the multi-point control apparatus, the located-region names, and the corresponding subscriber numbers. In this input operation, it is possible to eliminate the input of a subscriber number of one of the video-conference terminal apparatuses 1 connected with the management apparatus 4 via the private line 36. Further, the site information may comprise group names to be used for holding closed-area video conferences or the site information may be such that abbreviated dialing numbers, for example, correspond to the subscriber numbers. The thus input site information is then stored in the site-information storing area of the data base 12.

A video conference may be reserved by the video-conference-sponsor video-conference terminal apparatus 1 calling the video-conference network management apparatus 4. Alternatively, it is also possible to make the reservation by informing the video-conference network management apparatus 4 through a telephone or facsimile, the operator of the video-conference network management apparatus 4 as a result inputting the corresponding reservation information to the management apparatus 4 through the keyboard 20, for example. In this reservation-information input, the following information is input: the corresponding video-conference name indicating, for example, a group holding the video conference; the subscriber numbers of the corresponding video-conference terminal apparatuses; the video-conference starting date/time; and the video-conference ending date/time. Thus, it is possible to eliminate the information concerning the video-conference name from the reservation information in a case where the relevant video conference does not comprise a closed-area video conference.

The video-conference network management apparatus 4 reserves the above-mentioned reservation information through the schedule managing unit 6. That is, in the video-conference network management apparatus of FIG. 2, the processing function of the main control unit 11 reads the schedule management table 12B which may comprise previously written other reservation information resulting from the relevant reservation. Further, the above processing function examines as to whether or not the reservation information thus read from the schedule management table 12B comprises the following contents: in the same timezone, the same video-conference terminal apparatus is used to hold different video conferences simultaneously. Further, if the relevant video conference comprises a multi-point video conference such as three-participant video-conference, it is also examined as to whether or not the multi-point control apparatus 3 is free in the reserved timezone. If the apparatus 3 is not free there, this matter is reported to the relevant operator from the apparatus 4 so that the operator may switch the timezone to another timezone where the apparatus 3 is free. Further, if the relevant video conference is registered as a closed-area video conference, it is also examined as to whether or not the corresponding reservation information concerns a participant who does not belong to the relevant group. Then, if it is determined that the reservation information concerns the participant not belonging to the relevant group, this matter is reported to the operator so that the operator may remove the relevant person from the participants of the relevant conference. If it is determined as a result of the above examination that a predetermined reservation condition is fulfilled, then the video-conference network management apparatus 4 writes the thus allowed reservation information to the schedule management table 12B. Then, the apparatus 4 informs the operator or the video-conference terminal apparatus about the completion of the reservation-information reception.

The main control unit 11 of the video-conference network management apparatus 4 is provided with a clock function. The provided clock function is used for monitoring as to whether or not the video-conference starting date/time coincides with the current date/time. If it is determined as a result of the above monitoring that the above coincidence occurs, then the following operation occurs: the main control unit 11 reads the subscriber numbers of the relevant video-conference terminal apparatuses and activates the calling control unit 15. In a case where, for example, a between-two-points (sites) video conference is reserved as the conference B shown in FIG. 3, then the subscriber numbers b1 and b2 are read, and then the main control unit 11 activates the calling control unit 15 so as to perform calling processing for the video-conference terminal apparatus 1 having the subscriber number b1.

As a result, the management apparatus 4 is connected with the video-conference terminal apparatus 1 of the subscriber number b1 via the network 2. Then, the control function by means of the main control unit 11 causes the video-conference-starting command comprising the information concerning the subscriber number b2 of the other video-conference terminal apparatus 'to be sent to the b1-subscriber-number video-conference terminal apparatus'.

The video-conference terminal apparatus, which has received the thus sent command, then sends, to the video-conference network managing apparatus 4, a response indicating that the command has been normally received. Then, the video-conference terminal apparatus cuts the communication line between the video-conference terminal apparatus and the video-conference network managing apparatus 4. Then, the calling control unit 24 shown in FIG. 4 carries out a calling processing using the specified subscriber number b2. Thus, the video-conference terminal apparatuses having the subscriber numbers b1 and b2 are then connected with one another via the network 2 at the reserved video-conference starting date/time 14:00 so that the relevant video-conference may be held between the relevant two points (sites).

Then, as the video-conference is finished, the video-conference terminal apparatus cuts the communication line. In this case, after the line cutting, the video-conference terminal apparatus calls the video-conference network managing apparatus 4 through the corresponding calling processing by means of the calling control unit 24, the terminal apparatus then informing the apparatus 4 that the video conference has ended. Alternatively, after the video conference is started, the video-conference network managing apparatus 4 monitors via the network 2 as to whether or not the started video conference has finished by monitoring the line connecting state. Thus, it is possible to determine the ending of the video conference when the relevant line is cut. Further, the following processing is possible: the video-conference network managing apparatus 4 sends out a warning to the video-conference terminal apparatuses which are still being used in the video conference even though the relevant video-conference ending time has already passed. The above relevant video-conference ending time comprises one which has been previously registered in the schedule managing table 12B. Alternatively, it is also possible to send the corresponding information to the network so as to forcibly cut the relevant line, after sending out the warning. As mentioned above, after the video-conference ending time has passed, the setting of the corresponding reservation flag on the schedule managing table 12B is changed to "0". Alternatively, it is also possible to store the suitable information by writing, for example, abnormal ending information to the schedule management table.

Further, in a case where the video conference is held among multiple sites, such as more than three sites, the video-conference network management apparatus 4 activates the calling control unit 15 so as to make it call the multi-point control apparatus 3 when it becomes the relevant reserved video-conference starting date/time. Although FIG. 1 shows only one multi-point control apparatus 3, there may be the following cases: a plurality of apparatuses are provided for the same network; or alternatively, a plurality of apparatuses are provided for respective predetermined areas. There, it is possible to store the information that the multi-point control apparatus 3 is selected to be used in holding of the relevant video conference. This selection information is stored as the relevant reservation information in the schedule management table 12B at the time of the video-conference reservation processing. The above selection is made by reading the site information.

The video-conference network management apparatus 4, after being connected with the multi-point control apparatus 3 via the network 2, sends the video-conference commencement command to the multi-point control apparatus 3. The thus sent video-conference commencement command comprises the video-conference participants' subscriber numbers registered in the schedule management table 12B. The multi-point control apparatus 3, after receiving the thus sent command through the interface unit 32, causes the control unit 31 to send a response, indicating the normal reception of the command, to the video-conference network management apparatus 4. Then, the multi-point control apparatus 3 cuts the communication line which has connected it with the video-conference network management apparatus 4.

Then, the multi-point control apparatus 3, through the control function of the control unit 31, activates the calling control unit 35. Thus, the apparatus 3 causes the calling control unit 35 to carry out calling processing. That is, the subscriber numbers a1, a2 and a3 are added to the above video-conference commencement command, the subscriber numbers a1, a2 and a3 concerning the video conference named A shown in the schedule management table 12B of FIG. 3, for example. As a result, the calling control unit 35 carries out the calling processing in accordance with the added subscriber numbers a1, a2 and a3. Then, the called video-conference terminal apparatuses, having the subscriber numbers a1, a2 and a3 respond to the calling, respectively. As a result of this responding, as shown in FIG. 5, the video-conference apparatuses are connected with the interface units 33-1, 33-2 and 33-3 via the network 2, respectively. Then, video-signal distribution is made under the control of the control unit 31 so the that three-site (points) video-conference may be held.

Further, the video-conference network management apparatus 4 collects alarm information through the alarm collecting unit 8 from the video-conference terminal apparatuses 1 and the multi-point control apparatus 3. That is, when alarm information occurs in the video-conference terminal apparatus 1, the calling control unit 24 is activated so that the alarm-information occurring terminal apparatus 1 calls the video-conference network management apparatus 4 as mentioned above. Thus, the terminal apparatus 1 sends the alarm information including information concerning, for example, the terminal apparatus 1's subscriber number. Similarly, the multi-point control apparatus 3 activates the calling control unit 35 when alarm information occurs there. Then, the multi-point control apparatus 3 calls the video-conference network management apparatus 4 so as to send the alarm information including information concerning, for example, the multi-point control apparatus 3's number.

The video-conference network management apparatus 4, after receiving the thus sent alarm information, stores it in the alarm-information storing area 12C. Then, the management apparatus 4 displays on the display device 17 information concerning the video-conference terminal apparatus which sends the relevant alarm information and information concerning the contents of the relevant alarm information. In a case where the alarm-information-sending video-conference terminal apparatus is written in the schedule management table 12B, the corresponding alarm flag is made to become "1".

The video-conference network management apparatus 4 determines a certain trouble is occurring in a video-conference terminal apparatus or the multi-point control apparatus if a relevant one of them cannot send the command-normal-reception response for the video-conference commencement command or no response to call is made from a relevant one of them. As a result, the management apparatus 4 stores in the alarm-information storing area 12C information indicating the alarm-information occurring state. Also in this case, if the alarm-information occurring video-conference terminal apparatus comprise one which has been reserved in the schedule management table 12B, the corresponding alarm flag is set to "1".

After a video conference is reserved and registered in the schedule management table 12B, the management apparatus 4 calls relevant video-conference terminal apparatuses periodically every hour by reading the corresponding subscriber numbers. Then, the management apparatus 4 cuts the thus established communication line if a response is made from the called terminal apparatus. On the other hand, if no response is made from the called terminal, the management apparatus 4 further calls the relevant no-response terminal apparatus periodically every several minutes. Then, if even after a predetermined period in which successive call are made still results in no response, the management apparatus 4 determines that a certain trouble is occurring in the relevant terminal apparatus. As a result, the management apparatus 4 stores in the alarm-information storing area 12C information indicating the trouble occurring state. Further, the management apparatus sets the corresponding alarm flag in the schedule management table 12B to "1". As a result, it is possible to recognize that a trouble is occurring by viewing a monitor display 26, for example, of a video-conference terminal apparatus as well as a trouble occurring in a part concerning the transmission/reception function, such as the line interface unit 22.

In a case where a certain trouble occurs during holding of a video conference, then the relevant communication line is once cut. Then, similarly to the above described case of trouble occurrence, the calling control unit 24 is activated so that the video-conference network management apparatus 4 is called. Then, the thus established communication line is used to send the relevant alarm information.

Figure 3:
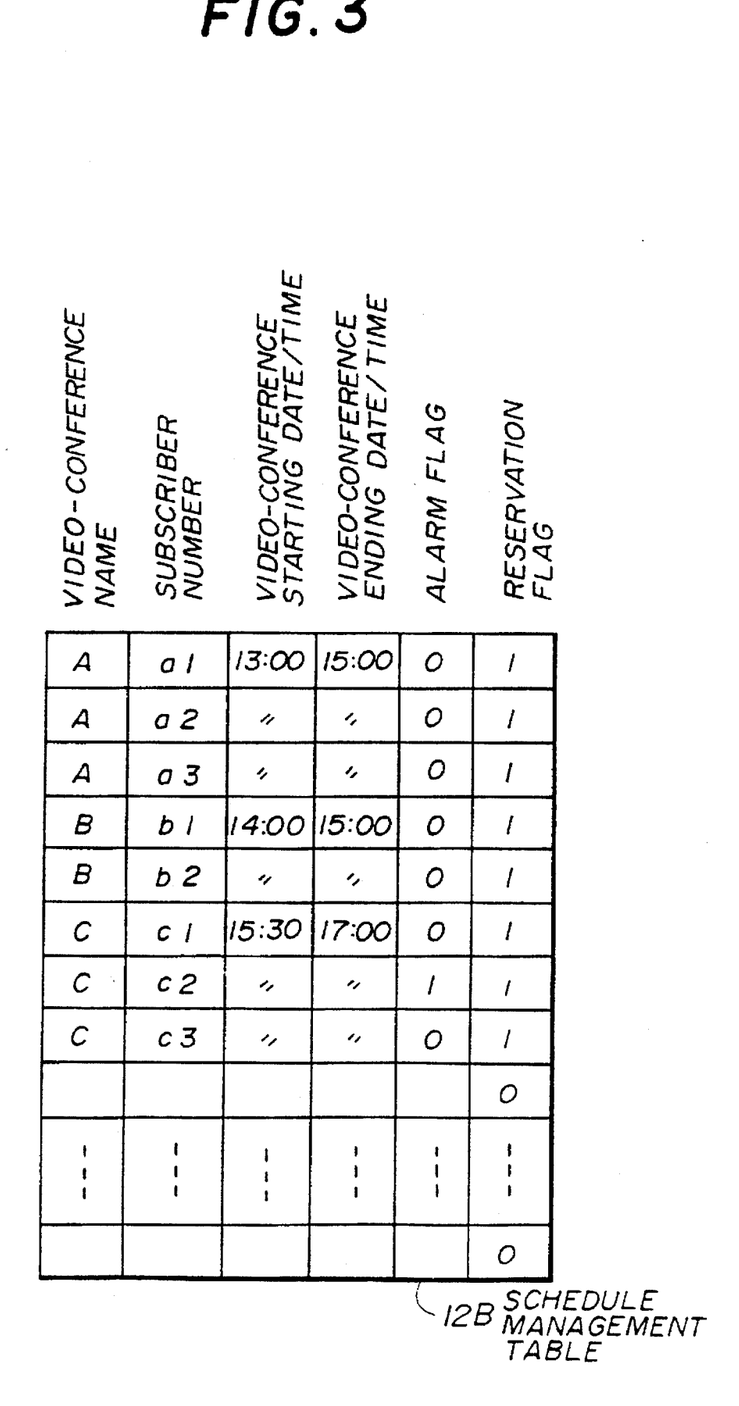
FIG. 3 shows a table for illustrating a schedule management table in the first embodiment of the present invention.

There may be a case where a certain trouble occurs in a video-conference terminal apparatus which has been reserved for a video conference, that is, a certain trouble occurs in the video-conference terminal apparatus having the subscriber number c2 concerning the video conference named C shown in FIG. 3, for example. In this case, the corresponding alarm flag is set to "1". As a result, when the relevant video-conference starting date/time comes, the c1-subscriber-number video-conference terminal apparatus is called by either the management apparatus 4 or the multi-point control apparatus 3. At this time, the c1-number terminal apparatus cannot respond to, for example, the calling or send the corresponding alarm information, if the thus occurring trouble still exists in the c1-number terminal apparatus. As a result, the thus set "1" of the alarm flag is maintained. On the other hand, if the thus occurring trouble is removed so that the c1-number terminal apparatus becomes normal at the relevant time, it responds normally to the call. Then, the thus set "1" of the alarm flag is changed to "0".

If the alarm flag of the subscriber number c2 remains set at "1", the respective video-conference terminal apparatuses having the subscriber numbers c1 and c3 are connected to each other via the multi-point control apparatus. In this case, the video-conference network management apparatus 4 informs the multi-point control apparatus 3 that a certain trouble has occurred in the video-conference terminal apparatus of the subscriber number c2. The multi-point control apparatus 3 then sends the following information to the respective video-conference terminal apparatuses of the subscriber numbers c1 and c3: a certain trouble has occurred in the terminal apparatus of the subscriber number c2, thus disabling the apparatus of c2 participating in the relevant video conference. The thus sent information may then be displayed on the respective monitor displays 26 of the apparatuses c1 and c3 so as inform the relevant video-conference participants about this information.

The video-conference network management apparatus 4 compares a subscriber number, of any video-conference terminal apparatus, included in the relevant reservation information, with a subscriber number of a video-conference terminal apparatus which has sent the alarm information, under the control of the main control unit 11, when the relevant reservation information is input. Then, if, as a result of the comparison, it is found that these subscriber numbers correspond to each other, the operator who has input the above relevant reservation information is informed of this result. Thus, the operator may determine whether the relevant video conference is to be reserved wherein the trouble-occurred video-conference terminal apparatus is removed from used by the participants in the relevant video conference, or the relevant video conference is to be reserved wherein the trouble-occurred video-conference terminal apparatus is not removed in accordance with the understanding that the relevant trouble will be removed at the date/time the relevant video conference is held. Alternatively, it is also possible to reserve the relevant video conference wherein another video-conference terminal apparatus is specified instead of the trouble-occurred video-conference terminal apparatus.

In a case where a video-conference terminal apparatus is connected to the private line 36, the private line 36 is connected to the control unit 31 via the private-line interface unit 33-4. The video-conference terminal apparatus thus connected to the private line 36 is stored as site information in the site-information storing area 12A of the data base 12 of the video-conference network management apparatus 4. As a result, it is possible to reserve a video conference wherein the thus registered video-conference terminal apparatus is used by the participants in the conference together with another video-conference terminal apparatus connected to the network 2. In this reservation, the subscriber number of the relevant private-line-connected video-conference terminal apparatus is registered, as a number indicating the private line, in the schedule management table 12B as a number associated with the participant of the relevant video conference.

Then, when the starting date/time of the reserved video conference comes, the video-conference network management apparatus 4, under the control of the main control unit 11, sends the multi-point control apparatus 3 a video-conference commencement command. This command comprises the subscriber number of the video-conference participants and the number associated with the private line. Then, the multi-point control apparatus 3 connects the video-conference terminal apparatus(es) connected to the control unit 31 via the network 2 and necessary one(s) of the line interface unit 33-1, 33-2 and 33-3 and the video-conference terminal apparatus connected to the control unit 31 via the private line 36 and the interface unit 33-4, under the control of the control unit 31. Thus, the video-conference network established via the network 2 and the video-conference network established via the private line 36 are connected with one another so that the relevant video conference may be held.

A video-conference network management apparatus 4 provided with a supplemental management apparatus 44 in a second embodiment of the video-conference network management system according to the present invention will now be described with reference to FIG. 6. The video-conference network management apparatus 4 of FIG. 6 comprises, as shown in FIG. 1, the site managing unit 5, the schedule managing unit 6 comprising the schedule managing table 12B, the transmission/reception control unit 7, and the alarm collecting unit 8. Further, the supplemental management apparatus 44 of FIG. 6 also comprises a site managing unit 45, a schedule managing unit 46, a transmission/reception control unit 47, and an alarm collecting unit 48. Thus, the second embodiment have an effect as if the video-conference network management apparatuses 4 are doubly provided.

Figure 6:
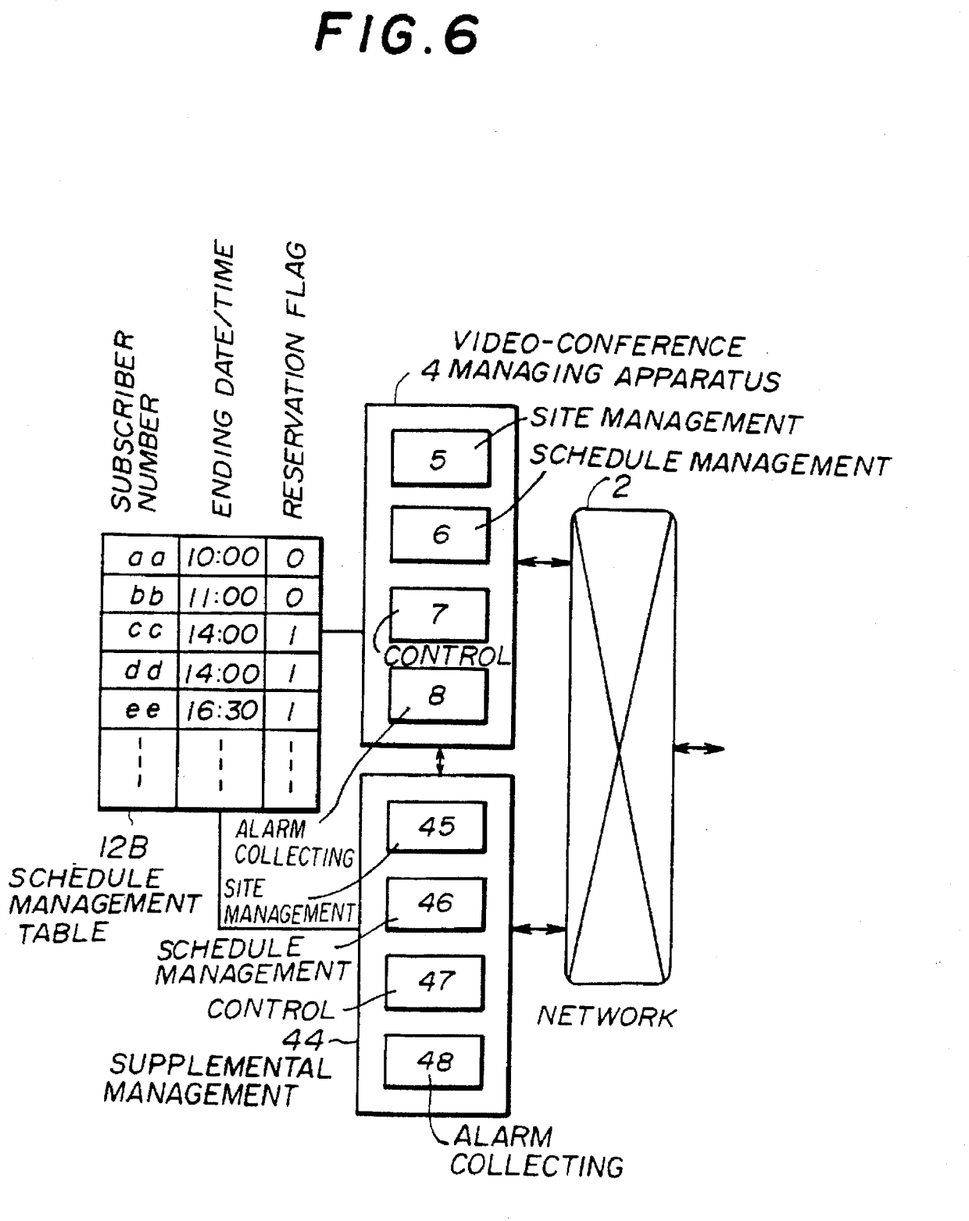
FIG. 6 shows a block diagram for illustrating a second embodiment of the present invention.

The schedule management table 12B indicated in FIG. 6 a plurality of areas, however, the table 12B only indicates areas (columns) for subscriber numbers, video-conference ending date/times and reservation flags. In an example shown in FIG. 6, there is a case where a video-conference ending date/time associated with a video conference, in which a video-conference terminal apparatus having the subscriber number aa is used, is ten o'clock. Also in this case, a video-conference ending date/time associated with a video conference in which a video-conference terminal apparatus having the subscriber number bb is used, is eleven o'clock. Thus, in this case, when it is twelve o'clock, both the above video conferences have finished. As a result, the respective corresponding reservation flags are "0". Furthermore in the example shown in FIG. 6, respective video-conference ending date/times associated with video conferences, in which the video-conference terminal apparatuses having the subscriber numbers cc and dd are used, are fourteen o'clock. In this case, further a video-conference ending date/time associated with a video conference in which the video-conference terminal apparatus having the subscriber number ee is used, is sixteen o'clock and thirty minutes. Thus, in this case, when it is twelve o'clock, none of the above video conferences have yet finished. As a result, the respective corresponding reservation flags are set at "1".

When a video conference has finished, a video-conference terminal apparatus or the multi-point control apparatus sends, to the video-conference network management apparatus, information indicating the finish of the reserved video conference. The thus sent video-conference finish information is reception-processed by the transmission/reception control unit 7. Then, the schedule managing unit 6 is informed of the thus processed information and as a result, the relevant reservation flag is cleared so as to be changed from "1" to "0".

There may be a case where a certain trouble occurs in the video-conference network management apparatus 4 and as a result a video conference registered in the schedule management table 12b is not held appropriately. Such a case may occur as a result of the following situation, for example: If the schedule managing unit 6 cannot operate properly, a relevant video-conference commencement command is not sent to the video-conference terminal apparatus or to the multi-point control apparatus even when the relevant video-conference commencement date/time comes. In this case, because the relevant video conference is not be held, the video-conference network management apparatus 4 cannot receive information indicating the finish of the relevant video conference accordingly. As a result, the relevant reservation flag in the schedule management table 12B is left set at "1" even after the ending date/time associated with the relevant video conference has passed.

The supplemental management apparatus 44 monitors the schedule management table 12B to determine whether or not there is a reservation flag therein which is left set at "1" even after the ending date/time associated with the relevant video conference has passed. In an example, if it is fifteen o'clock in the state of the schedule management table 12B as shown in FIG. 6, the reservation flag associated with (in the line same as that of) the ending date/time of fourteen o'clock is "1". This means that the relevant video conference has not finished even after the ending date/time has passed. Thus, it is possible to determine that a certain trouble has occurred in the video-conference network management apparatus 4.

In this case, the supplemental management apparatus 44, informing the video-conference network management apparatus 4 of the occurrence of the trouble, puts the schedule management table 12B under the control of the supplemental management apparatus 44. Then, the supplemental management apparatus 44, using the schedule management table 12, activates the transmission/reception control unit 45 so as to make it send the relevant video conference commencement command for a video conference to be held at the next video-conference commencement date/time. Thus, the function of the supplemental management apparatus 44 enables problem resulting from a certain trouble existing in the video-conference network management apparatus 4 to be overcome. As a result, it becomes possible to hold the reserved video conferences successively even when such a trouble occurs.

In the above second embodiment of the video-conference network management system according to the present invention, the schedule management table 12B is commonly used by both the video-conference network management apparatus 4 and the supplemental management apparatus 44. Instead of this manner of use, in the second embodiment of the video-conference network management system according to the present invention, one of the respective schedule management tables 12B is provided for each of the apparatuses 4 and 44. Thus, reservation information the same as that registered in the schedule management table 12B of the apparatus 4 is also registered in the table 12B of the apparatus 44. Further, instead of the construction of the supplemental management apparatus 44 as shown in FIG. 6, it is possible to make the construction thereof simpler than that of the construction of the video-conference network management apparatus 4. This is because the fundamental function of the supplemental management apparatus 44 is to hold reserved video conferences successively if a certain trouble disables the video-conference network management apparatus 4 so that the apparatus 4 is prevented from holding these conferences. In an example of such a simplified construction, the alarm collecting unit 48 and/or the site managing unit 45 may be eliminated.

Other advantages obtained by the above mentioned embodiments of the video-conference network management system according to the present invention will now be described. The above-mentioned alarm collecting function is used to notify an operator that the proper work for repairing the alarm generating video-conference terminal apparatus 4 should be carried out.

Further, the corresponding line of the alarm flag area (column) provided in the schedule management table 12B is set to be "1" when the alarm generating video-conference terminal apparatus is a terminal apparatus which is to participate in the reserved video conference as mentioned above. Then, the relevant alarm information is collected by means of the alarm collecting unit 8. This state "1" of the alarm flag may be used to recognize the trouble-occurred video-conference terminal apparatus from among the terminal apparatuses which are to participate in the reserved video conference. This recognition may occur when the relevant video-conference commencement command is sent. Further, the state "1" of the alarm flag is also used so that the video-conference network management apparatus 4 may inform other video-conference terminal apparatuses which are to participate in the relevant video conference that a certain video-conference terminal apparatus cannot participate in the video conference. This informing may occur when the relevant video conference is started. Thus, smooth running of video conferences is made possible.

Further, the alarm flag is set to be "1" as a result of the following procedure: calls are periodically made at predetermined time intervals to video-conference terminal apparatuses 1 which are to participate in a reserved video conference; then it is determined that the video-conference terminal apparatus which responds to these calls is in a normal state and the video-conference terminal apparatus which does not respond thereto is in an abnormal state; and then an alarm flag of "1" is set for the abnormal-state terminal apparatus. The thus set alarm flag enables determination of normality/abnormality in the video-conference terminal apparatuses 1 before the commencement of the relevant video conference. As a result, if a video-conference terminal apparatus is determined to be in an abnormal state, it is possible to carry out repairing work on the trouble-occurred apparatus at an earlier stage.

In the case where a private-line video-conference network is used in a video conference, the function of the multi-point control apparatus 3 enables the private-line video-conference network to be easily connected to a video-conference network established by the normal-network 2 at the commencement of the video conference. There, the private line in the private-line video-conference network is connected with the multi-point control apparatus 3. Then, the multi-point control apparatus 3, if appropriate, connects the video-conference terminal apparatus(es) in the private-line video-conference network and the video-conference terminal apparatus(s) in the normal-network 2 video-conference network.

Further, the supplemental management apparatus, monitoring the state of the reservation flag in the schedule management table 12B, determines that a video conference has not been held even though the relevant video-conference commencement date/time has passed. This determination may be made by detecting the state "1" of the relevant reservation flag then remaining. A condition where the reserved video conference can not be held means that the video-conference network management apparatus 4 cannot properly manage video conferences. As a result, the supplemental management apparatus substitutes a correctly operation video-conference network management apparatus for the defective video-conference network management apparatus 4. That is, since the supplemental management apparatus can manage the video-conference network, reliability in the management of the video-conference network is improved.

Further, the present invention is not limited to the above described embodiments, and variations and modifications may be made without departing from the scope of the present invention.

What is claimed is:

1. A video-conference network managing system for managing a video-conference network, the video-conference network comprising a plurality of video-conference terminal apparatuses connected with one another via a network so as to enable a video conference to be held, said managing system comprising:

site managing means for managing each video-conference terminal apparatus of said plurality of video-conference terminal apparatuses;

schedule managing means for managing a schedule concerning the video conference to be held;

transmission/reception control means for sending, if appropriate, a command to said plurality of video-conference terminal apparatuses in accordance with said schedule concerning the video conference; and alarm collecting means for collecting alarm information, if any, from said plurality of video-conference terminal apparatuses, said alarm collecting means periodically calling said plurality of video-conference terminal apparatuses before a date/time of the video conference and collecting said alarm information based on responses from said plurality of video-conference terminal apparatuses to periodical calls.

2. The video-conference network managing system according to claim 1, wherein said schedule concerning the video conference to be managed by said schedule managing means comprises video-conference participant information and video-conference date/time information, each information resulting from reception of corresponding reservations.

3. The video-conference network managing system according to claim 2, wherein said transmission/reception control means, in accordance with said schedule concerning the video-conference managed by said schedule managing means, sends a command for starting the video conference to a video-conference terminal apparatus, among said plurality of video-conference terminal apparatuses, specified in said video-conference participant information, and said transmission/reception control means further sends said alarm information collected by said alarm collecting means to said video-conference terminal apparatus specified in said video-conference participant information.

4. The video-conference network managing system according to claim 2, wherein:

said schedule managing means has a schedule managing table comprising an area in which said video-conference participant information, said video-conference date/time information and an alarm flag are filled therein;

said transmission/reception control means, using said schedule managing table, sending a command for starting the video conference appropriately based on said video-conference date/time information and said video-conference participant information resulting from the reception of corresponding reservations;

said transmission/reception control means then either removing the alarm flag, previously set in said schedule managing table, for a first video-conference terminal apparatus among said plurality of video-conference terminal apparatuses, if said first video-conference terminal apparatus responds to the sent command for starting the video conference, or maintains the set state thereof for said first video-conference terminal apparatus if said first video-conference terminal apparatus does not respond to said sent command; and said transmission/reception control means then informing a second video-conference terminal apparatus concerning the video conference among said plurality of video-conference terminal apparatuses, that said first video-conference terminal apparatus will not participate in the video conference.

5. The video-conference network managing system according to claim 4, wherein:

said transmission/reception control means, using said schedule managing table, periodically calls said first video-conference terminal apparatus before the date/time of said video conference;

said transmission/reception control means then determines that a certain trouble has occurred in a first video-conference terminal apparatus among said plurality of video-conference terminal apparatuses if said first video-conference terminal apparatus does not respond to the periodical calls, said transmission/reception control means as a result setting the alarm flag, on said schedule managing table, for said first video-conference terminal apparatus; and said transmission/reception control means then again periodically calls said first video-conference terminal apparatus, and then removes the once set alarm flag for said first video-conference terminal apparatus if said first video-conference terminal apparatus responds to the periodical calls made again by said transmission/reception control means.

6. The video-conference network managing system according to claim 2, wherein:

said schedule managing means has a schedule managing table comprising an area in which said video-conference participant information, said video-conference date/time information and a reservation flag are filled therein;

said schedule managing means setting appropriately the reservation flag, on said schedule managing table, for a video-conference terminal apparatus among said plurality of video-conference terminal apparatuses in response to reception of a reservation and removes the once set reservation flag after the video conference is finished;

said video-conference network managing system further comprises a supplementary managing apparatus for searching said schedule managing table for the reservation flag;

said supplementary managing apparatus determining that a certain trouble has occurred in said video-conference network managing system if the reservation flag still remains even if the ending date/time of the video conference has already passed, said supplementary managing apparatus as a result performing the processing which was to be originally performed by said schedule managing means.

7. The video-conference network managing system according to claim 1, wherein:

said managing system uses a multi-point control apparatus for controlling the connection made among said plurality of video-conference terminal apparatuses;

said site managing means additionally manages said multi-point control apparatus; and said alarm collecting means additionally collects alarm information from said multi-point control apparatus.

8. The video-conference network managing system according to claim 7, wherein:

said multi-point control apparatus is connected with said network so as to form said video-conference network and is also connected with another video-conference terminal apparatus via a private line so as to form another video-conference network; and said multi-point control apparatus then appropriately connects said video-conference network formed via said network to said private video-conference network formed via said private line, in accordance with said schedule concerning the video conference managed by said schedule managing means.

9. A video-conference network managing system for managing a video-conference network, the video-conference network comprising a plurality of video-conference terminal apparatuses connected with one another via a network so as to enable a video conference to be held, said managing system comprising:

site managing means for managing each video-conference terminal apparatus of said plurality of video-conference terminal apparatuses;

schedule managing means for managing a schedule concerning the video conference to be held;

transmission/reception control means for sending, if appropriate, a command to said plurality of video-conference terminal apparatuses in accordance with said schedule concerning the video conference; and alarm collecting means for collecting alarm information, if any, from said plurality of video-conference terminal apparatuses, said schedule managing means having a schedule managing table comprising an area containing video-conference participant information, video-conference date/time information and an alarm flag;

said transmission/reception control means, using said schedule managing table, sending a command for starting the video conference appropriately based on said video-conference date/time information and said video-conference participant information;

said transmission/reception control means then either removing the alarm flag, previously set in said schedule managing table, for a first video-conference terminal apparatus among said plurality of video-conference terminal apparatuses, if said first video-conference terminal apparatus responds to the sent command for starting the video conference, or maintains the set state thereof for said first video-conference terminal apparatus if said first video-conference terminal apparatus does not respond to said sent command; and said transmission/reception control means then informing a second video-conference terminal apparatus concerning the video conference among said plurality of video-conference terminal apparatuses, that said first video-conference terminal apparatus will not participate in the video conference.

10. The video-conference network managing system according to claim 9, wherein:

said transmission/reception control means, using said schedule managing table, periodically calls said first video-conference terminal apparatus before the date/time of said video conference;

said transmission/reception control means then determines that a certain trouble has occurred in a first video-conference terminal apparatus among said plurality of video-conference terminal apparatuses if said first video-conference terminal apparatus does not respond to the periodical calls, said transmission/reception control means as a result setting the alarm flag, on said schedule managing table, for said first video-conference terminal apparatus; and said transmission/reception control means then again periodically calls said first video-conference terminal apparatus, and then removes the once set alarm flag for said first video-conference terminal apparatus if said first video-conference terminal apparatus responds to the periodical calls made again by said transmission/reception control means.

11. The video-conference network managing system according to claim 9, wherein:

said managing system uses a multi-point control apparatus for controlling the connection made among said plurality of video-conference terminal apparatuses;

said site managing means additionally manages said multi-point control apparatus; and said alarm collecting means additionally collects alarm information from said multi-point control apparatus.

12. The video-conference network managing system according to claim 11, wherein:

said multi-point control apparatus is connected with said network so as to form said video-conference network and is also connected with another video-conference terminal apparatus via a private line so as to form another video-conference network; and said multi-point control apparatus then appropriately connects said video-conference network formed via said network to said private video-conference network formed via said private line, in accordance with said schedule concerning the video conference managed by said schedule managing means.

* * * * *

UNITED STATES PATENT AND TRADEMARK OFFICE
CERTIFICATE OF CORRECTION

PATENT NO. : 5,642,156
DATED : June 24, 1997
INVENTOR(S) : Koichi SAIKI

It is certified that error appears in the above-indentified patent and that said Letters Patent is hereby corrected as shown below:

n the title page, item (22), delete "Jan. 11, 1996" and
nsert --Jan. 10, 1996--.

Signed and Sealed this

Fourth Day of November, 1997

Attest:

BRUCE LEHMAN

Attesting Officer

Commissioner of Patents and Trademarks